US008788751B2

(12) United States Patent
Pidapa

(10) Patent No.: US 8,788,751 B2
(45) Date of Patent: Jul. 22, 2014

(54) RESTORING SPANNED VOLUMES OF DATA

(75) Inventor: Manorama Pidapa, Andhra Pradesh (IN)

(73) Assignee: CA, Inc., Islandia, NY (US)

(*) Notice: Subject to any disclaimer, the term of this patent is extended or adjusted under 35 U.S.C. 154(b) by 274 days.

(21) Appl. No.: 12/434,052

(22) Filed: May 1, 2009

(65) Prior Publication Data
US 2010/0281210 A1 Nov. 4, 2010

(51) Int. Cl.
*G06F 13/00* (2006.01)
*G06F 13/28* (2006.01)
*G06F 11/14* (2006.01)

(52) U.S. Cl.
CPC ........ *G06F 11/1469* (2013.01); *G06F 11/1448* (2013.01); *G06F 11/1458* (2013.01); *G06F 2201/815* (2013.01)
USPC ........... 711/114; 711/112; 711/161; 711/162; 711/173; 711/E12.103

(58) Field of Classification Search
USPC ................................... 711/162, 112, E12.103
See application file for complete search history.

(56) References Cited

U.S. PATENT DOCUMENTS

| 5,644,787 | A | * | 7/1997 | Nakamura et al. ............... 710/33 |
| 5,671,350 | A | | 9/1997 | Wood |
| 6,016,553 | A | | 1/2000 | Schneider et al. ............... 714/21 |
| 6,401,178 | B1 | * | 6/2002 | Gagne et al. .................. 711/162 |
| 6,446,175 | B1 | | 9/2002 | West et al. .................... 711/162 |
| 6,505,216 | B1 | | 1/2003 | Schutzman et al. ........... 707/204 |
| 6,742,138 | B1 | * | 5/2004 | Gagne et al. .................. 714/6.31 |
| 7,337,289 | B2 | | 2/2008 | Pillai et al. |
| 7,487,308 | B1 | | 2/2009 | Dalal et al. |
| 7,516,288 | B2 | | 4/2009 | Pillai et al. |
| 2006/0036905 | A1 | * | 2/2006 | Li ....................................... 714/8 |
| 2008/0140730 | A1 | * | 6/2008 | Toshine ......................... 707/200 |
| 2010/0115198 | A1 | * | 5/2010 | Jess ................................ 711/114 |

FOREIGN PATENT DOCUMENTS

EP 1291831 * 3/2003

OTHER PUBLICATIONS

M. Pidapa, U.S. Appl. No. 12/434,027, Notice of Allowance and Fee(s) Due received from US Patent and Trademark Office, mailed Nov. 15, 2011.
M. Pidapa, U.S. Appl. No. 12/434,027, Notice of Allowance and Fee(s) Due received from US Patent and Trademark Office, mailed Sep. 30, 2011.

* cited by examiner

Primary Examiner — Eric S Cardwell
(74) Attorney, Agent, or Firm — Baker Botts, LLP

(57) ABSTRACT

According to one embodiment, a backup is searched for data to be restored from a volume. The backup comprises multiple disks. The volume is stored in one or more spans on the disks. The spans containing the data to be restored from the volume are identified as desired spans, and a current disk is searched for the desired spans. A first subset of data is read from the desired spans on the current disk. A second subset of data is recorded on an unread list. The second subset of data comprises the data to be restored from the desired spans that are not on the current disk. The remaining data is read from the remaining disks according to the unread list.

20 Claims, 2 Drawing Sheets

RESTORING SPANNED VOLUMES OF DATA

TECHNICAL FIELD

The present disclosure relates generally to data restoration, and more specifically to restoring data from spanned volumes of Virtual Machines.

BACKGROUND

A Virtual Machine may be a software application that is installed on a physical computer. The functionality provided by the Virtual Machine may be similar to that provided by the physical computer. For example, the Virtual Machine may run software programs. A backup process may copy the data of the Virtual Machine for use in the event that the original data becomes lost, damaged, or otherwise unusable. The backed up data may be used to restore the original data.

SUMMARY OF EXAMPLE EMBODIMENTS

According to one embodiment, a backup is searched for data to be restored from a volume. The backup comprises multiple disks. The volume is stored in one or more spans on the disks. The spans containing the data to be restored from the volume are identified as desired spans, and a current disk is searched for the desired spans. A first subset of data is read from the desired spans on the current disk. A second subset of data is recorded on an unread list. The second subset of data comprises the data to be restored from the desired spans that are not on the current disk. The remaining data is read from the remaining disks according to the unread list.

Certain embodiments of the invention may provide one or more technical advantages. A technical advantage of one embodiment may be that data from a single volume of a Virtual Machine may be efficiently read from outside the Virtual Machine. That is, the data from the volume of a Virtual Machine may be read without having to restore the entire Virtual Machine. As a result, the amount of time and/or local storage space required to restore the data from the volume of a Virtual Machine may be decreased.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of certain embodiments of the present invention and features and advantages thereof, reference is now made to the following description taken in conjunction with the accompanying drawings, in which.

DETAILED DESCRIPTION

Figure 1:
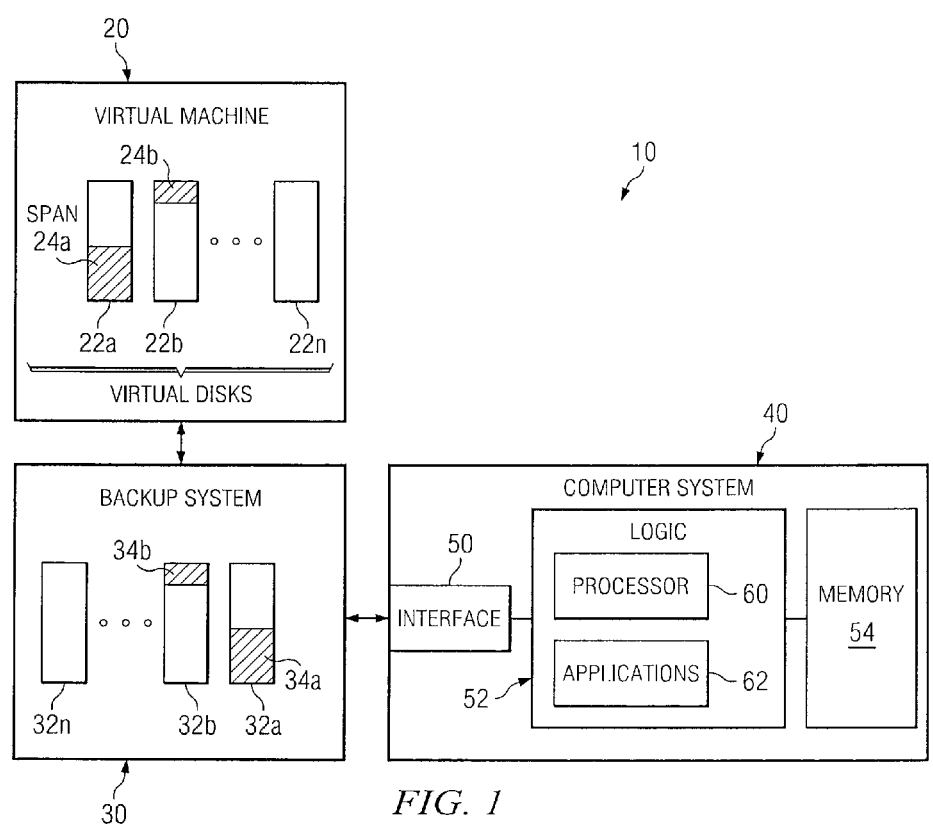
FIG. 1 illustrates an example of a system that may be used to restore data from a spanned volume of a Virtual Machine.
Figure 2:
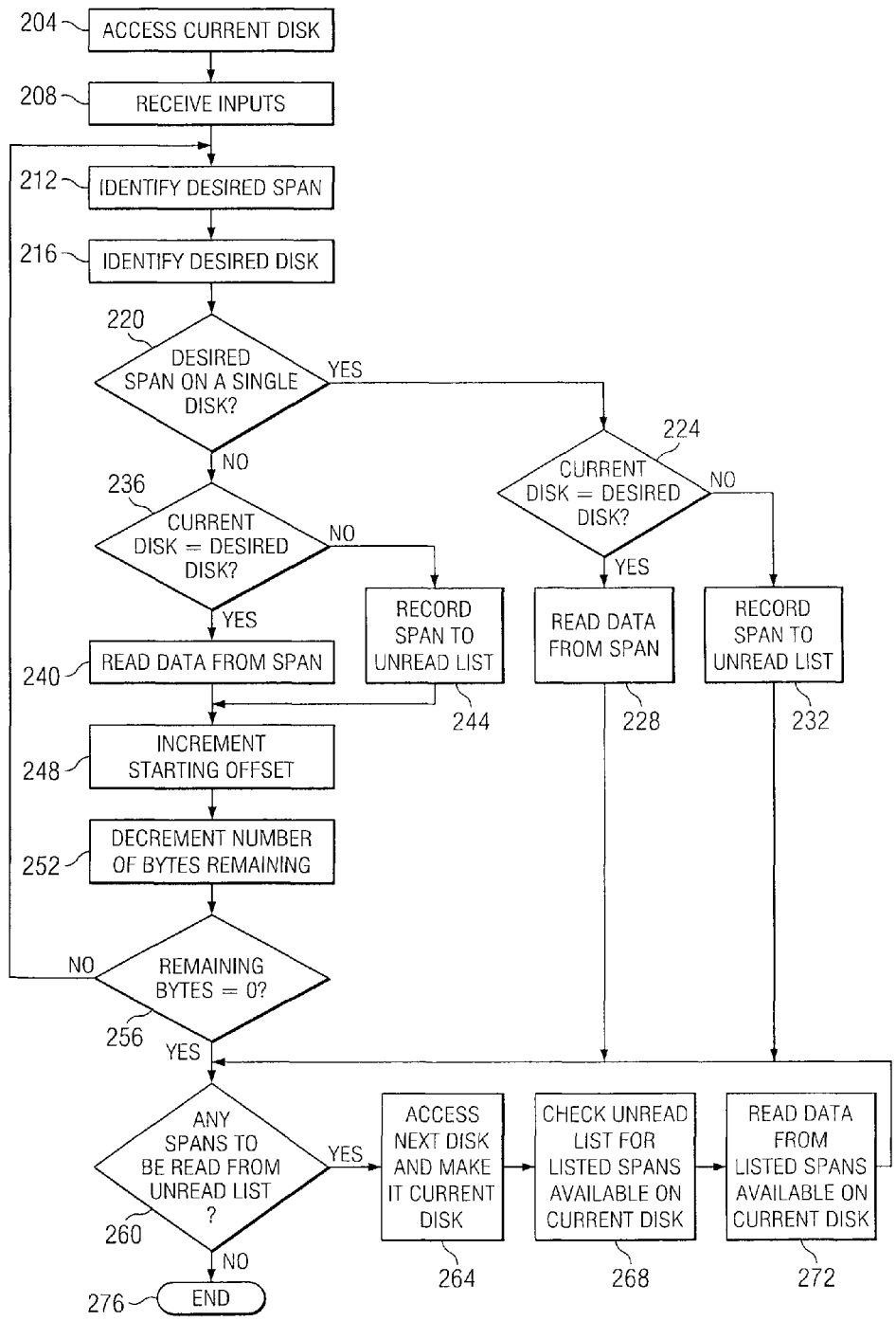
FIG. 2 illustrates an example method for restoring data from a spanned volume of a Virtual Machine.

Embodiments of the present invention and its advantages are best understood by referring to FIGS. 1 and 2 of the drawings, like numerals being used for like and corresponding parts of the various drawings.

FIG. 1 illustrates an example of a system 10 that may be used to restore data from a spanned volume of a Virtual Machine. In certain embodiments, system 10 may comprise a Virtual Machine 20, a backup system 30, and a computer system 40. The Virtual Machine 20 may be a software application comprising data, which may be copied to the backup system 30. The computer system 40 may access the backup system 30 to read and/or restore the data. For example, computer system 40 may restore the data from the backup system 30 if the original data becomes inaccessible or unusable. In certain embodiments, the computer system 40 may restore data from particular volumes of the Virtual Machine 20 without reading all the data of the backup system 30.

In some embodiments, the Virtual Machine 20 may be a software application installed on a computer. The Virtual Machine 20 may provide computer functionality without requiring the entire hardware resources of a physical computer. For example, the Virtual Machine 20 may run software programs. The Virtual Machine 20 may comprise any suitable number of virtual disks 22. The virtual disks 22 may be functionally similar to hard disks of a physical machine and may comprise volumes. The volumes may comprise data files of the Virtual Machine 20, such as document files, text files, or any other files. The virtual disks 22 may store the volumes in any suitable manner. In some embodiments, a complete volume may be stored on a single disk. Examples of volumes stored on a single disk include simple volumes and mirrored volumes. In some embodiments, a complete volume may be stored on multiple disks. Examples of volumes stored on multiple disks include striped volumes and spanned volumes.

In some embodiments, a volume may be stored on a Virtual Machine 20 in spans. A span may describe a number of bytes configured to store data. For example, the data may be a portion of a spanned volume. A spanned volume may be a volume that begins on one virtual disk 22 and continues to the next virtual disk 22 if the first virtual disk 22 becomes full. A spanned volume may span any suitable number of virtual disks required to store it. As an example, FIG. 1 illustrates a spanned volume that begins on a first virtual disk 22a and ends on a second virtual disk 22b. The first virtual disk 22a may store a first span 24a, which may begin at the first available memory of the virtual disk 22a and continue to the end of the disk. The second virtual disk 22b may store a second span 24b, which may begin at the beginning of virtual disk 22b and end at a position determined by the number of bytes in the volume. Thus, the length of a span 24 may vary depending on the size of the volume being stored.

Although FIG. 1 illustrates one example of a spanned volume, the spanned volume may be configured in any suitable way. For example, the spanned volume may begin at any position of the Virtual Machine 20. Moreover, Virtual Machine 20 may have any suitable number of virtual disks 22 and spans 24. In addition, the spans 24 may vary in length, but an individual span 24 may have a maximum length equal to the size of the virtual disk 22 on which it is stored.

In some embodiments, the backup system 30 may backup the Virtual Machine 20. For example, the backup system 30 may copy each of the virtual disks 22 to backup disks 32. In the illustration of FIG. 1, the backup disk 32a may backup the virtual disk 22a, the backup disk 32b may backup the virtual disk 22b, and so on. The backup of a virtual disk 22 may include a backup of a span stored on the virtual disk. For example, a span 24a of the virtual disk 22a may be a copied to a span 34a of the backup disk 32a. The span 34a may begin and end at the same position as its counterpart span 24a. In some embodiments, the order of the backup disks 32 on the backup system 30 may differ from the order of the virtual disks 22 on the Virtual Machine 20. In some embodiments, the virtual disks 22 may be backed up in reverse order. For example, the virtual disk 22a located at the beginning of the Virtual Machine 20 may correspond to the backup disk 32a located at the end of the backup system 30. Although the storage order of the disks may change, the logical sequence of the disks remains the same.

In some embodiments, a backup disk 32 may be a file. The file may be any suitable format, such as virtual hard disk (.vhd) format or Virtual Machine disk (.vmkd) format. The backup disks 32 may be stored to a Compact Disk (CD), a Digital Video Disk (DVD), a hard disk, a flash memory device, a tape, or any other tangible computer readable medium. In some embodiments, the computer readable medium may be sequential. A sequential computer readable medium may limit access to data to the order in which the data was stored. An example of a sequential computer readable medium may be a tape. In some embodiments, a tape may store the backup disks 32 in the reverse order of their logical sequence.

In some embodiments, the computer system 40 may access the backup system 30 to restore the Virtual Machine 20. In some embodiments, the computer system 40 may restore data from a particular volume of the Virtual Machine 20. The computer system 40 may parse the data of the backup system 30 to take data that arrives out of order and arrange it into the correct order. Volumes stored on multiple disks may arrive out of order and, therefore, may benefit from parsing. These volumes may include spanned volumes stored to disks arranged in reverse order on sequential computer readable media. In some embodiments, computer system 40 may parse the data according to the method of FIG. 2, discussed below. The method of FIG. 2 may allow the computer system 40 to restore data from a spanned volume without storing all of the backup disks 32 together in local storage. As a result, the restore time and/or the amount of local space required to perform the restore may be decreased.

In certain embodiments, computer system 40 may comprise an interface 50, logic 52, memory 54, and/or other suitable element. Interface 50 receives input, sends output, processes the input and/or output, and/or performs other suitable operation. In certain embodiments, interface 50 accesses a backup disk 32 of the backup system 30. Interface 50 may comprise hardware and/or software.

Logic 52 performs the operations of the component, for example, executes instructions to generate output from input. In certain embodiments, logic 52 may restore data from a spanned volume of the Virtual Machine 20. Logic 52 may restore the data from the spanned volume by parsing the data of the backup disks 32.

Logic 52 may include hardware (such as a processor 60), software (such as applications 64), and/or other logic. Logic 52 may be encoded in one or more tangible media and may perform operations when executed by a computer. Certain logic 52, such as a processor 60, may manage the operation of a component. Examples of a processor 60 include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 54 stores information. Memory 54 may comprise one or more tangible, computer-readable, and/or computer-executable computer readable medium, and may exclude signals or carrier waves. Examples of memory include computer memory (for example, Random Access Memory (RAM) or Read Only Memory (ROM)), mass computer readable media (for example, a hard disk), removable computer readable media (for example, a Compact Disk (CD) or a Digital Video Disk (DVD)), database and/or network storage (for example, a server), and/or other computer-readable medium.

Modifications, additions, or omissions may be made to system 10 without departing from the scope of the invention. The components of system 10 may be integrated or separated. Moreover, the operations of system 10 may be performed by more, fewer, or other components. For example, the operations of restoring data from a spanned volume may be performed by one component or more than one component. Additionally, operations of system 10 may be performed using any suitable logic comprising software, hardware, and/or other logic. As used in this document, "each" refers to each member of a set or each member of a subset of a set.

FIG. 2 illustrates an example method 200 for restoring data from a spanned volume of a Virtual Machine. According to the method 200, a computer system may access a current disk of a backup system. The computer system may parse through the current disk to locate the spans comprising the data to be restored from a volume (desired spans). The subset of data to be restored from the desired spans available on the current disk may be read by the computer system, and the subset of desired spans that are not available on the current disk may be recorded in an unread list. A subset may include zero or more bytes. The unread list may track the position, the size, and/or the disk of each unread span. After the current disk has been checked for the data to be restored from desired spans, the computer system may access the next disks of the backup system to read the data listed on the unread list. The data read from each span may be inserted into its appropriate position within the restored data, such as the restored file or folder.

The method 200 may begin at step 204. At step 204, the current disk may be accessed and tracking mechanisms for the backup system may be initialized. The current disk may be any disk of the backup. For example, if the disks are backed up to a tape, the current disk may be the disk stored at the beginning of the tape. In some embodiments, the current disk may be stored locally while it is being processed. The remaining disks of the backup need not be stored locally while the current disk is being processed. Tracking mechanisms may include an unread list, a starting offset, and a number of bytes remaining.

At step 208, inputs are received. The inputs may comprise a starting offset and a number of bytes remaining. The initial starting offset may indicate the place within the backup that data to be restored from the volume begins. The initial number of bytes remaining may indicate the total size of the data to be restored from the volume.

A desired span may be identified at step 212. The desired span may be the span that contains the starting offset of the data to be restored from the volume. The end of the data to be read from the desired span may be calculated using the number of bytes remaining. If the number of bytes remaining for the data to be restored indicates that the volume ends on a second disk, the end of the data read from the current span may be truncated to coincide with the end of the first disk. The amount of data to be read from the current span may be the number of bytes from the starting offset of the data to the end of the span.

At step 216, a desired disk may be identified. The desired disk may be the disk that comprises the desired span. In some embodiments, the desired disk may be identified based on the starting offset of the data to be restored.

At step 220, it may be determined whether the data to be restored is on a single disk. For example, the number of bytes remaining may be used in determining whether the data to be restored is on a single disk. If the data is on a single disk, the method continues to step 224.

The computer system may determine if the data to be restored is on the current disk at step 224. The current disk accessed in step 204 may be compared to the desired disk identified in step 216. If the disks are the same, the data is on the current disk and the method continues to step 228.

At step 228, the computer system reads the data to be restored from the current disk. In some embodiments, the computer system may locate the data to be restored based on the inputs received at step 208. For example, the computer system may begin reading at the position of the starting offset and end reading at the position of the starting offset plus the number of bytes remaining. The method then proceeds to step 260.

If the desired span comprising the data to be restored is not on the current disk at step 224, the method proceeds to step 232. At step 232, the desired span is added to the unread list. In some embodiments, the unread list may record a disk, starting offset, and/or number of bytes to be read from the desired span. The unread list may be one list or multiple lists. For example, the unread list may be multiple lists each describing a particular disk of the backup. The method then proceeds to step 260.

If the data to be restored is not on a single disk at step 220, the method proceeds to step 236. At step 236, the computer system may determine if the offset to be read is on the current disk. The current disk accessed in step 204 may be compared to the desired disk identified in step 216. If the disks are the same, the desired data is on the current disk and the method continues to step 240.

At step 240, the computer system reads the data to be restored from the current disk. In some embodiments, the computer system may locate the data to be restored based on the beginning and the end of the span identified in step 212. For example, the computer system may begin reading at the position of the starting offset and end reading at the end of the current disk. The method then proceeds to step 248.

If the desired span comprising the data to be restored is not on the current disk at step 236, the method proceeds to step 244 where the data to be restored is added to the unread list. In some embodiments, the unread list may record a disk, starting offset, and/or number of bytes to be read from the desired span. The unread list may be one list or multiple lists. For example, the unread list may be multiple lists each describing a particular disk of the backup. The method then proceeds to step 248.

At step 248, the starting offset may be incremented. If the data from the desired span was read at step 240, the starting offset may be incremented by the number of bytes read. Alternatively, if the data from the desired span was recorded to the unread list at step 244, the starting offset may be incremented by the number of bytes recorded to the list. In some embodiments, the size of the increment may be equal to the number of bytes read from the desired span determined in step 212. The method proceeds to step 252.

At step 252, the number of bytes remaining may be decremented. In the data from the desired span was read at step 240, the number of bytes remaining may be decremented by the number of bytes read. Alternatively, if the data from the desired span was recorded to the unread list at step 244, the number of bytes remaining may be decremented by the number of bytes recorded to the list. In some embodiments, the size of the decrement may be equal to the number of bytes to be read from the desired span determined in step 212. In some embodiments, the size of the decrement to the number of bytes remaining may be equal to the size of the increment to the starting offset in step 248. The method proceeds to step 256.

At step 256, the computer system determines whether the number of bytes remaining is equal to zero. If the number of bytes remaining is equal to zero, it may indicate that the current disk has been searched for data residing on all of the spans of the volume. During the search, the data of the desired spans available on the current disk may have been read, while the data of the remaining desired spans may have been recorded to the unread list. If the number of bytes remaining is not equal to zero, the method returns to step 212. If the number of bytes remaining is equal to zero, the method continues to step 260.

If the number of bytes remaining does not equal zero at step 256, it may indicate that the data to be restored has not been searched across all of the spans of the volume. If the number of bytes remaining does not equal zero, the method returns to step 212. At step 212, a search is conducted for the next desired span of the volume based on the starting offset value calculated in step 248 and the number of bytes remaining value calculated in step 252.

At step 260, the computer system determines if there is any data to be read from the remaining spans according to the unread list. If there is data to be read, the method proceeds to step 264.

In some embodiments, the computer system may access a next disk of the backup and make it the current disk at step 264. The method proceeds to step 268 where the computer system checks the unread list for listed spans available on the current disk. For example, in embodiments where the unread list comprises multiple lists, the computer system may check the list corresponding to the now current disk. At step 272, the computer system may read the data from the listed spans available on the current disk. In some embodiments, the data from the span may be read into its correct position within the restored data according to the data's starting offset. The method then returns to step 260.

If there are not any spans to be read according to the unread list at step 260, the method proceeds to step 276. At step 276, the method ends.

Modifications, additions, or omissions may be made to the method without departing from the scope of the invention. The method may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed:
1. A method comprising:
 accessing a current disk of a backup, the backup comprising a plurality of disks, the backup configured to store a volume in a plurality of spans stored sequentially across the plurality of disks, the backup being stored in reverse order from a logical sequence of the volume;

identifying a plurality of desired spans of the volume, the desired spans storing data to be restored;
reading a first subset of the data to be restored from the current disk, the first subset comprising a first span of the desired spans;
parsing a remainder of the current disk to locate one or more remaining spans of the desired spans, the first span being different from the one or more remaining spans;
in response to parsing the remainder of the current disk, determining that the one or more remaining spans of the desired spans are not located on the current disk;
recording a second subset of the data to be restored on an unread list, the second subset comprising the remaining spans of the desired spans that are not on the current disk;
reading the second subset of the data to be restored from one or more remaining disks according to the unread list; and
arranging the read first subset of the data to be restored and the read second subset of the data to be restored into the logical sequence of the volume.

2. The method of claim 1, the reading the remaining data to be restored from the one or more remaining disks according to the unread list further comprising repeating until the remaining data to be restored indicated by the unread list has been read:
accessing a next disk of the backup;
determining if the one or more desired spans comprising the data to be restored according to the unread list are on the next disk; and
reading the data to be restored from the one or more desired spans if they are on the next disk.

3. The method of claim 1, the identifying the one or more desired spans further comprising:
receiving an input comprising a starting offset for the data to be restored; and
identifying a desired disk based on the starting offset, the desired disk comprising the data to be restored.

4. The method of claim 1, further comprising:
the reading the first subset of the data to be restored further comprising:
incrementing a starting offset by a number of bytes read, the starting offset indicating a location of the data to be restored; and
the recording the second subset of the data to be restored on an unread list further comprising:
incrementing the starting offset by a number of bytes recorded.

5. The method of claim 1, the reading the remaining data to be restored from the one or more remaining disks according to the unread list further comprising:
continuing to read the remaining content until a number of bytes remaining is zero.

6. The method of claim 1, further comprising:
the reading the first subset of the data to be restored further comprising:
decrementing a number of bytes remaining by a number of bytes read, the number of bytes remaining indicating a portion of the data to be restored that has not been read or recorded on the unread list; and
the recording the second subset of the data to be restored on an unread list further comprising:
decrementing the number of bytes remaining by a number of bytes recorded.

7. The method of claim 1, further comprising:
the reading the first subset of the data to be restored further comprising:
incrementing a starting offset by a number of bytes read, the starting offset indicating a location of the data to be restored; and
decrementing a number of bytes remaining by the number of bytes read, the number of bytes remaining indicating a portion of the data to be restored that has not been read or recorded on the unread list; and
the recording the second subset of the data to be restored on an unread list further comprising:
incrementing the starting offset by a number of bytes recorded; and
decrementing the number of bytes remaining by the number of bytes recorded.

8. An apparatus comprising:
an interface configured to:
access a current disk of a backup, the backup comprising a plurality of disks, the backup configured to store a volume in a plurality of spans stored sequentially across the plurality of disks, the backup being stored in reverse order from a logical sequence of the volume; and
one or more processors configured to:
identify a plurality of desired spans of the volume, the desired spans storing data to be restored;
read a first subset of the data to be restored from the current disk, the first subset comprising a first span of the desired spans;
parse a remainder of the current disk to locate one or more remaining spans of the desired spans, the first span being different from the one or more remaining spans;
in response to parsing the remainder of the current disk, determine that the one or more remaining spans of the desired spans are not located on the current disk;
record a second subset of the data to be restored on an unread list, the second subset comprising the remaining spans of the desired spans that are not on the current disk;
read the second subset of the data to be restored from one or more remaining disks according to the unread list; and
arrange the read first subset of the data to be restored and the read second subset of the data to be restored into the logical sequence of the volume.

9. The apparatus of claim 8:
the interface further configured to:
access a next disk of the backup;
the one or more processors configured to read the remaining data to be restored from the one or more remaining disks according to the unread list further comprising repeating until the remaining data to be restored indicated by the unread list has been read by:
determining if the one or more desired spans comprising the data to be restored according to the unread list are on the next disk; and
reading the data to be restored from the one or more desired spans if they are on the next disk.

10. The apparatus of claim 8, the one or more processors configured to identify the one or more desired spans further comprising:
receiving an input comprising a starting offset for the data to be restored; and
identifying a desired disk based on the starting offset, the desired disk comprising the data to be restored.

11. The apparatus of claim 8, further comprising:
the one or more processors configured to read the first subset of the data to be restored further comprising:

incrementing a starting offset by a number of bytes read, the starting offset indicating a location of the data to be restored; and the one or more processors configured to record the second subset of the data to be restored on an unread list further comprising:

incrementing the starting offset by a number of bytes recorded.

12. The apparatus of claim 8, the one or more processors configured to read the remaining data to be restored from the one or more remaining disks according to the unread list further comprising:

continuing to read the remaining content until a number of bytes remaining is zero.

13. The apparatus of claim 8, further comprising:

the one or more processors configured to read the first subset of the data to be restored further comprising:

decrementing a number of bytes remaining by a number of bytes read, the number of bytes remaining indicating a portion of the data to be restored that has not been read or recorded on the unread list; and the one or more processors configured to record the second subset of the data to be restored on an unread list further comprising:

decrementing the number of bytes remaining by a number of bytes recorded.

14. The apparatus of claim 8, further comprising:

the one or more processors configured to read the first subset of the data to be restored further comprising:

incrementing a starting offset by a number of bytes read, the starting offset indicating a location of the data to be restored; and decrementing a number of bytes remaining by the number of bytes read, the number of bytes remaining indicating a portion of the data to be restored that has not been read or recorded on the unread list; and the one or more processors configured to record the second subset of the data to be restored on an unread list further comprising:

incrementing the starting offset by a number of bytes recorded; and decrementing the number of bytes remaining by the number of bytes recorded.

15. A non-transitory computer program product comprising:

a computer readable storage medium having computer readable program code embodied therewith, the computer readable program code comprising:

computer readable program code configured to access a current disk of a backup, the backup comprising a plurality of disks, the backup configured to store a volume in a plurality of spans stored sequentially across the plurality of disks, the backup being stored in reverse order from a logical sequence of the volume;

computer readable program code configured to identify a plurality of desired spans of the volume, the desired spans storing data to be restored;

computer readable program code configured to read a first subset of the data to be restored from the current disk, the first subset comprising a first span of the desired spans;

computer readable program code configured to parse a remainder of the current disk to locate one or more remaining spans of the desired spans, the first span being different from the one or more remaining spans;

computer readable program code configured to, in response to parsing the remainder of the current disk, determine that the one or more remaining spans of the desired spans are not located on the current disk;

computer readable program code configured to record a second subset of the data to be restored on an unread list, the second subset comprising the remaining spans of the desired spans that are not on the current disk;

computer readable program code configured to read the second subset of the data to be restored from one or more remaining disks according to the unread list; and computer readable program code configured to arrange the read first subset of the data to be restored and the read second subset of the data to be restored into the logical sequence of the volume.

16. The computer program product of claim 15, further comprising:

computer readable program code configured to access a next disk of the backup;

computer readable program code configured to determine if the one or more desired spans comprising the data to be restored according to the unread list are on the next disk; and computer readable program code configured to read the data to be restored from the one or more desired spans if they are on the next disk.

17. The computer program product of claim 15, further comprising:

computer readable program code configured to receive an input comprising a starting offset for the data to be restored; and computer readable program code configured to identify a desired disk based on the starting offset, the desired disk comprising the data to be restored.

18. The computer program product of claim 15, further comprising:

computer readable program code configured to read the first subset of the data to be restored by incrementing a starting offset by a number of bytes read, the starting offset indicating a location of the data to be restored; and computer readable program code configured to record the second subset of the data to be restored on an unread list by incrementing the starting offset by a number of bytes recorded.

19. The computer program product of claim 15, further comprising:

computer readable program code configured to read the first subset of the data to be restored by decrementing a number of bytes remaining by a number of bytes read, the number of bytes remaining indicating a portion of the data to be restored that has not been read or recorded on the unread list; and computer readable program code configured to record the second subset of the data to be restored on an unread list by decrementing the number of bytes remaining by a number of bytes recorded.

20. The computer program product of claim 15, further comprising:

computer readable program code configured to read the first subset of the data to be restored further by:

incrementing a starting offset by a number of bytes read, the starting offset indicating a location of the data to be restored;

decrementing a number of bytes remaining by the number of bytes read, the number of bytes remaining indicating a portion of the data to be restored that has not been read or recorded on the unread list; and computer readable program code configured to record the second subset of the data to be restored on an unread list by:

incrementing the starting offset by a number of bytes recorded; and decrementing the number of bytes remaining by the number of bytes recorded.

* * * * *